United States Patent
Nguyen et al.

(10) Patent No.: US 6,261,506 B1
(45) Date of Patent: *Jul. 17, 2001

(54) METHOD OF MAKING A THREE-DIMENSIONAL OBJECT

(75) Inventors: Hop D. Nguyen, Quartz Hill; Jouni P. Partanen, Los Angeles, both of CA (US)

(73) Assignee: 3D Systems, Inc., Valencia, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,161

(22) Filed: Nov. 13, 1998

Related U.S. Application Data

(62) Division of application No. 08/726,973, filed on Oct. 7, 1996, now Pat. No. 5,855,718.

(51) Int. Cl.[7] .............................. B29C 35/08; B29C 41/02
(52) U.S. Cl. ......................... 264/401; 264/308; 700/119; 700/120
(58) Field of Search ..................................... 264/308, 401; 425/135, 174.4, 375; 700/119, 120

(56) References Cited

U.S. PATENT DOCUMENTS

| 5,256,340 | * | 10/1993 | Allison et al. ................... 264/401 |
| 5,415,820 | * | 5/1995 | Furuta et al. ..................... 264/401 |
| 5,616,293 | | 4/1997 | Ashtiani-Zarandi et al. . |
| 5,669,433 | | 9/1997 | Sterett et al. . |
| 5,855,718 | | 1/1999 | Nguyen et al. . |

FOREIGN PATENT DOCUMENTS

| 484 183 A1 | 5/1992 | (EP) . |
| 94/29047 | 12/1994 | (WO) . |
| 95/29053 | 2/1995 | (WO) . |
| 97/18933 | 5/1997 | (WO) . |

* cited by examiner

*Primary Examiner*—Leo B. Tentoni
(74) *Attorney, Agent, or Firm*—Ralph D'Alessandro; Ted Rittmaster

(57) ABSTRACT

A method and apparatus for building three-dimensional objects having an internal structure, wherein the structure is discontinuous and is composed from a plurality of patterns and bridging patterns formed on a plurality of levels, wherein a bridging level and pattern reside between previous and subsequent levels from which the bridging pattern obtains at least a portion of its pattern. A portion of the bridging pattern is obtained from the pattern on the previous level and a portion of the bridging pattern is obtained from the pattern on the subsequent level.

7 Claims, 9 Drawing Sheets

FIG. 1g
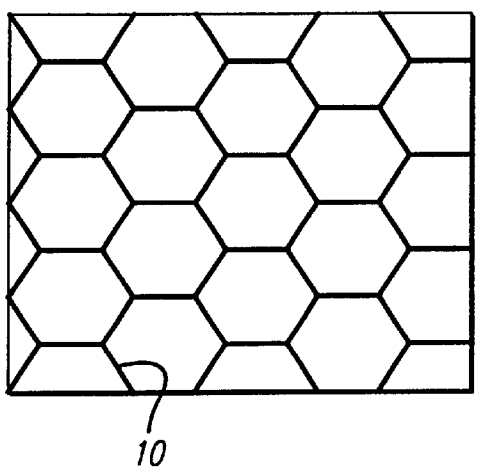
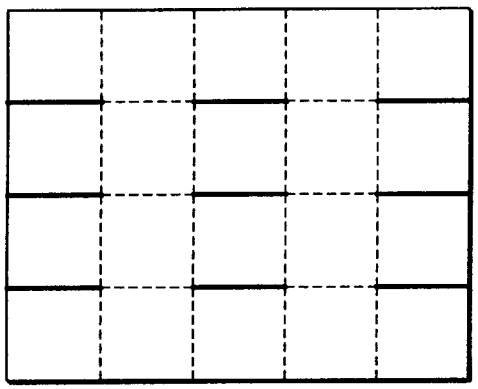
FIG. 2a
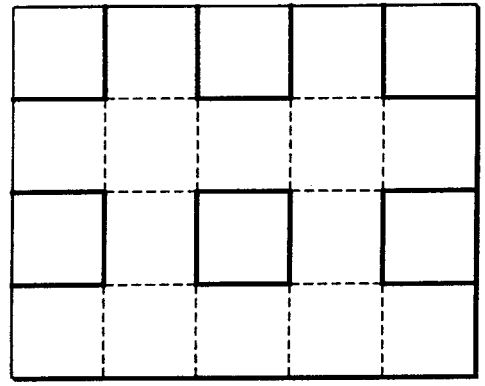
FIG. 2b
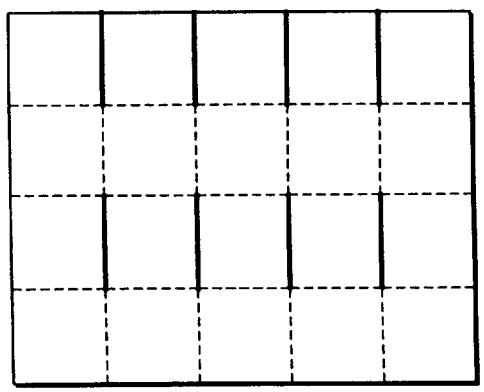
FIG. 2c
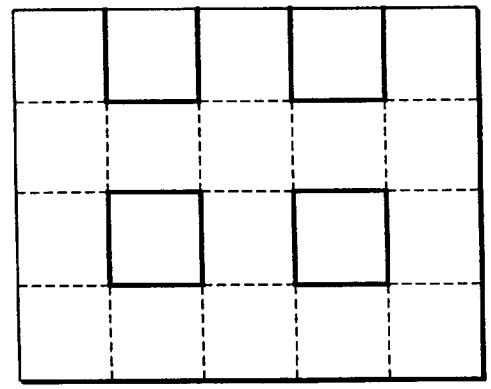
FIG. 2d FIG. 3g
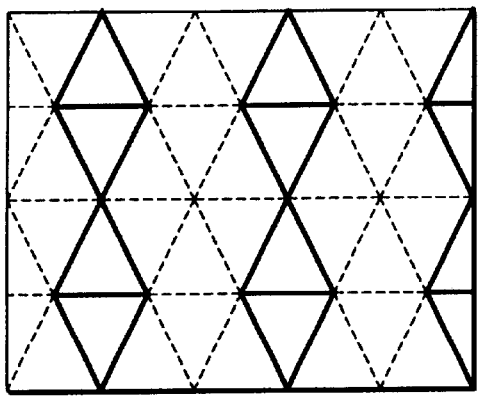
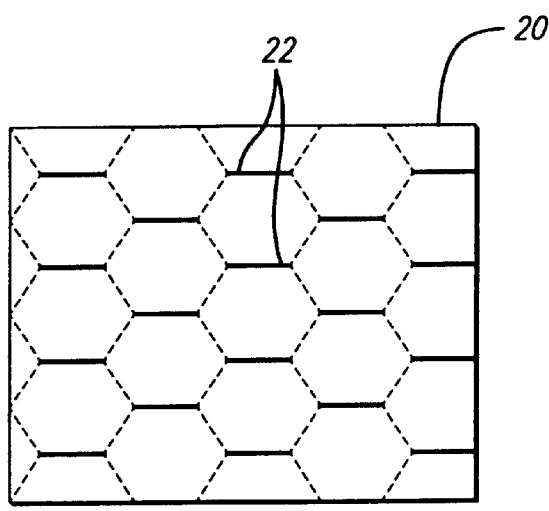
FIG. 4a
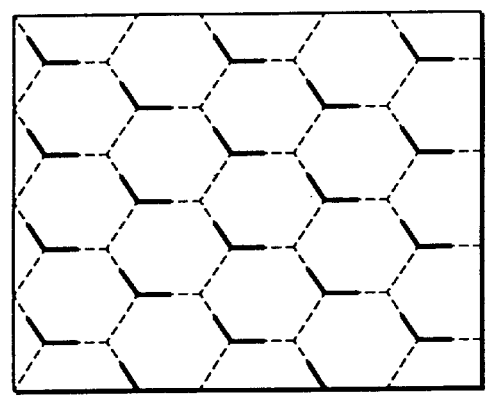
FIG. 4b
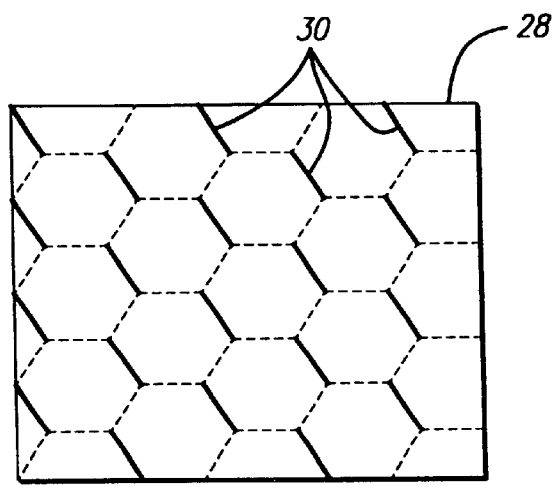
FIG. 4c
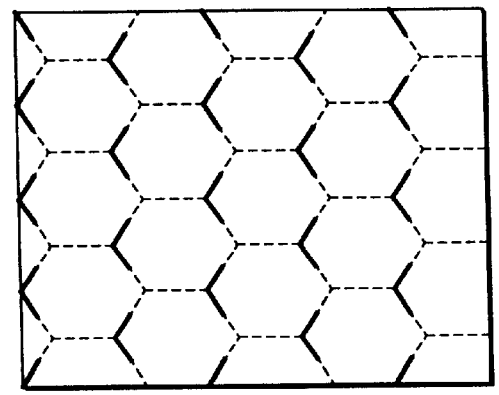
FIG. 4d FIG. 5e
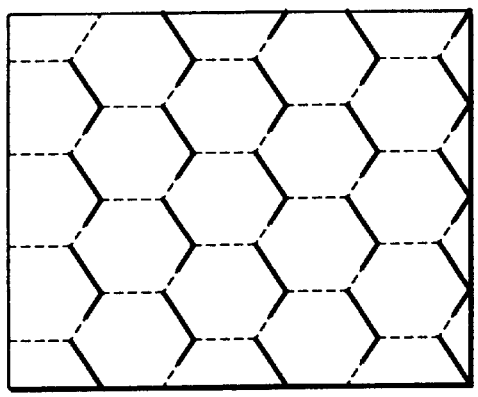
FIG. 5f
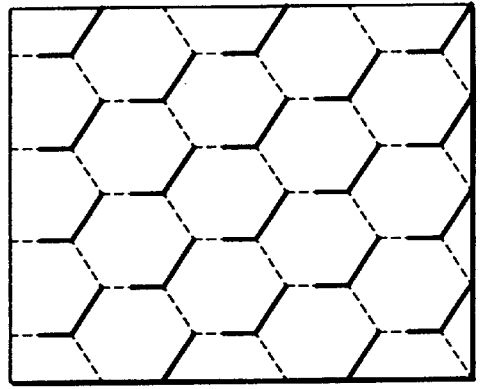
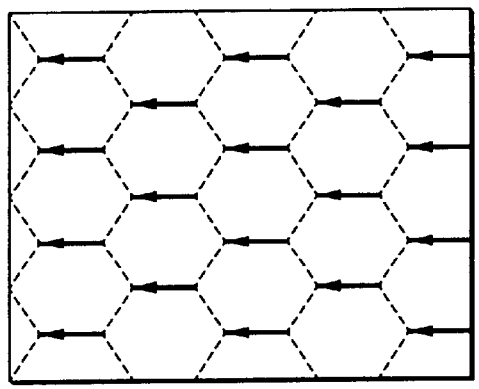
FIG. 6a
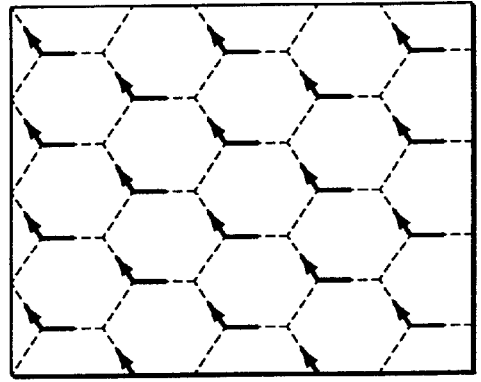
FIG. 6b
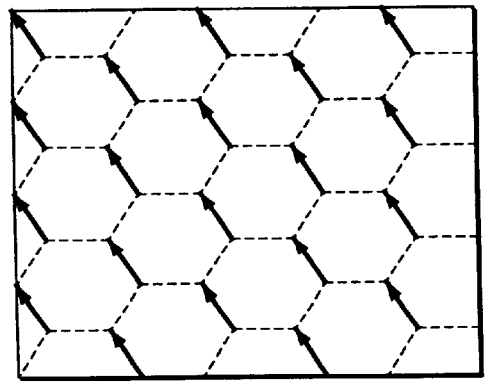
FIG. 6c
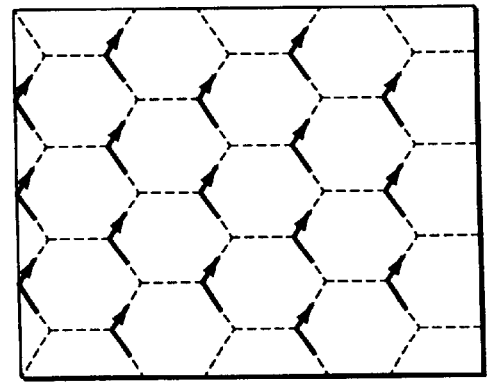
FIG. 6d

METHOD OF MAKING A THREE-DIMENSIONAL OBJECT

This is a divisional of U.S. patent application Ser. No. 08/726,973, filed Oct. 7, 1996, now U.S. Pat. No. 5,855,718.

FIELD OF THE INVENTION

This invention relates to improved methods and apparatus for building partially solidified three dimensional objects through the application of Rapid Prototyping & Manufacturing techniques such as, for example, stereolithography and selective deposition modeling.

BACKGROUND OF THE INVENTION

Various approaches to automated or semi-automated three-dimensional ("3D") object production or Rapid Prototyping & Manufacturing (RP&M) have become available in recent years, characterized in that each proceeds by building 3D objects from 3D computer data descriptive of the objects in an additive manner from a plurality of formed and adhered laminae. These laminae are sometimes called object cross-sections, layers of structure, object layers, layers of the object, or simply layers (if the context makes it clear that solidified structure of appropriate shape is being referred to). Each lamina represents a cross-section of the three-dimensional object. Typically each successive lamina is formed and adhered to a stack of previously formed and adhered laminae. In some RP&M technologies, techniques have been proposed which deviate from a strict layer-by-layer build up process wherein only a portion of an initial lamina is formed and prior to the formation of the remaining portion(s) of the initial lamina, at least one subsequent lamina is at least partially formed or, in some techniques, at least a recoating process for forming the at least one subsequent lamina is performed.

According to one such approach, a three-dimensional object is built by applying successive layers of unsolidified, flowable material to a working surface, and then selectively exposing the layers to synergistic stimulation in desired patterns, causing the layers to selectively harden into object laminae which adhere to previously formed object laminae. In this approach, material is typically applied to the working surface both to areas which will not become part of an object lamina, and to areas which will become part of an object lamina. Typical of this approach is Stereolithography (SL), as described in U.S. Pat. No. 4,575,330, to Hull. According to one embodiment of Stereolithography, the synergistic stimulation is radiation from a UV laser, and the material is a photopolymer. Another example of this approach is Selective Laser Sintering (SLS), as described in U.S. Pat. No. 4,863,538, to Deckard, in which the synergistic stimulation is IR radiation from a $CO_2$ laser and the material is a sinterable powder. As the above two examples use eletromagnetic radiation as the source of stimulation, they may be classified as photo based stereolithography. A third example of stereo lithography is Three-Dimensional Printing (3DP) and Direct Shell Production Casting (DSPC), as described in U.S. Pat. Nos. 5,340,656 and 5,204,055, to Sachs, et al., in which the synergistic stimulation is a chemical binder (e.g. an adhesive), and the material is a powder consisting of particles which bind together upon selective application of the chemical binder.

According to a second such approach, an object is formed by successively cutting object cross-sections having desired shapes and sizes out of sheets of material to form object laminae. Typically in practice, the sheets of paper are stacked and adhered to previously cut sheets prior to their being cut, but cutting prior to stacking and adhesion is possible. Typical of this approach is Laminated Object Manufacturing (LOM), as described in U.S. Pat. No. 4,752,352, to Feygin in which the material is paper, and the means for cutting the sheets into the desired shapes and sizes is a $CO_2$ laser. U.S. Pat. No. 5,015,312 to Kinzie also addresses building object with LOM techniques.

According to a third such approach, object laminae are formed by selectively depositing an unsolidified, flowable material onto a working surface in desired patterns in areas which will become part of an object lamina. After or during selective deposition, the selectively deposited material is solidified to form a subsequent object lamina which is adhered to the previously formed and stacked object laminae. These steps are then repeated to successively build up the object lamina-by-lamina. This object formation technique may be generically called Selective Deposition Modeling (SDM). The main difference between this approach and the first approach is that the material is deposited only in those areas which will become part of an object lamina or a support lamina. Typical of this approach is Fused Deposition Modeling (FDM), as described in U.S. Pat. Nos. 5,121,329 and 5,340,433, to Crump, in which the material is dispensed in a flowable state into an environment which is at a temperature below the flowable temperature of the material, and which then hardens after being allowed to cool. A second example is the technology described in U.S. Pat. No. 5,260,009, to Penn. A third example is Ballistic Particle Manufacturing (BPM), as described in U.S. Pat. Nos. 4,665,492; 5,134,569; and 5,216,616, to Masters, in which particles are directed to specific locations to form object cross-sections. A fourth example is Thermal Stereolithography (TSL) as described in U.S. Pat. No. 5,141,680, to Almquist et. al. All of the patents referenced above in this section are hereby incorporated by reference as if set forth in full.

In some typical practices of photo-based stereolithography, objects or "parts" are built on a layer-by-layer basis, where each layer represents a thin cross-section of the part to be formed. Early approaches to stereolithographic part building were based on the complete filling of layers (e.g. substantial polymerization of all regions of a cross-section to a thickness at least as deep as the layer thickness). This filling was either done by the selective scanning of a pencil of light using a focused or defocused beam, or by flood exposure of the appropriate cross-sectional image. The pencil of light approach strictly used complete filling of cross-sections based on the scanning of adjacent overlapping vectors or raster lines until the entire cross-sectional pattern was cured.

Other sterolithographic techniques used an internal lattice of partially cured building material ("cross-hatch" or "hatch") in place of completely filling the successive cross-sections. The internal structures primarily consisted of cross-hatch separated by untransformed building material (e.g. liquid photopolymer or the like). In this approach, the outer and inner edges of each layer may be solidified by scanning of what are called "boundary vectors" (also termed, "boundaries" or "border vectors" or "borders") to form boundary lines or zones. These lines or zones separate the interior object regions (i.e., regions designed to be solid) of cross-sections from exterior non-object regions (e.g., regions designed to be hollow). Cross-sections or portions of cross-sections that bound external regions of the part are completely solidified by exposing skin fill data (termed "fill" or "skin").

The skin, crosshatch, and borders may trap untransformed building material (e.g. liquid photopolymer) internally in the part structure and hold it in place while the part is being created. The trapped untransformed building material (e.g. liquid photopolymer) and at least partially transformed building material (e.g. at least partially cured polymer) which forms the boundaries, hatch, and skin may be brought to full transformation (e.g. polymerization) in a later process know as "post curing". For additional information on post-curing, see U.S. patent application Ser. No. 07/415,134 now abandoned.

Fairly extensive post-curing can be required when the internal cross-hatch lattice only defines discrete x-z and y-z, planes, or the like, which are separated from each other by more than the width cured by a beam, as in such cases long vertical corridors of unpolymerized material remain substantially uncured until post-processing.

In some instances, down-facing features are given both hatch and skin fill, thereby increasing the possibility of overexposure of the regions where the hatch and fill coincide.

One build style that utilizes hatch as opposed to solid fill is called QUICKCAST™. An in-depth explanation of the QUICKCAST™ build style and its uses is found in U.S. Pat. No.5,256,340 to Allison; U.S. patent application, Ser. No. 08/233,026, filed Apr. 25, 1994, now abandoned; and U.S. patent application, Ser. No. 08/428,950, filed Apr. 25, 1995, now abandoned. This patent and these two applications are assigned to the assignee of the present invention. These references are incorporated by reference as though fully set forth herein.

In general, the QUICKCAST™ build style hollows a solid object and builds the interior of the object, for support purposes, with an internal support structure (e.g., hatch structure). An early QUICKCAST™ build style used an equilateral triangle hatch structure. In this embodiment, the hatch structure was offset between periodic layers. Typical build parameters used resulted in a void ratio of approximately 80%. In this context, void ratio is defined as the difference between 100% and the percentage of the ratio of the weight of the QUICKCAST™ object versus the weight of the associated object built as a solid.

A typical use for objects built with the QUICKCAST™ style is as patterns for investment casting. When used as patterns for shell type investment casting, the part must be burned out of a ceramic mold without cracking the mold. Though the above described triangular build style resulted in a reasonable drainage of liquid from the object, it was common for some liquid to remain trapped inside the object. The excess strength of the object and the inability to drain all of the liquid out resulted in an excess number of molds cracking prior to object burn out and associated inability to use the objects for their intended purpose.

Another QUICKCAST™ build style used a square hatch pattern and typically resulted in a void ratio in the mid to low 80s. Not only was the void ratio somewhat higher, as a square pattern is weaker than a triangle, it is believed the structure collapses more easily. This structure resulted in an improved success rate for creating ceramic shells though an excessive number of failures was still common. The success rates were still below the common 95% rate for wax investment casting patterns.

One attempt to improve the drainage of the liquid from the object is the utilization of a broken hatch style to form a discontinuous hatch structure, wherein the structure, a hexagon, is formed using opposite sides of the hexagonal pattern on successive groups of layers. The patterns for successive groups of layers are depicted in FIGS. 1a, 1c and 1e.

Although this broken hatch style increased the drainage of liquid from the object, the building of the hatch style was not reliable as each element of structure on the first layer above a transition from one pattern to another is only supported by its endpoints.

In light of the foregoing, a need exists for a more reliable build style that increases the drainage of liquid from the object.

RELATED APPLICATIONS AND PATENTS

The assignee of the instant application, 3D Systems, Inc., is also the owner of a number of U.S. Patent Applications and U.S. Patents in the RP&M field, and particularly, in the photo-based Stereolithography (SL) portion of that field. These patents include disclosures which can be combined with the teachings of the instant application to provide enhanced SL and SDM object formation techniques. The following commonly owned U.S. Patent Applications and U.S. Patents are hereby incorporated by reference as if set forth in full herein:

| App No. | Topic | Status and/or Patent No. |
|---|---|---|
| 08/722,335 filed September 27, 1996 | Fundamentals of Selective Deposition Modeling (SDM) are taught. | Pending |
| 08/722,326 filed September 27, 1996 | Data transformation techniques for use in converting 3D object data into support and object data for use in Selective Deposition Modeling (SDM) systems based on SDM/Thermal Stereolithography (TSL) principles. | Pending |
| 08/534,813 08/534,447 | | Pending |
| 08/535,772 Filed September 27, 1995 | Material used by SDM/TSL systems is described. | Abandoned |
| 08/534,477 Filed September 27, 1995 | Description of SDM/TSL systems. | Abandoned |
| 08/484,582 | Fundamental elements of Stereolithography are taught. | 5,573,722 |
| 08/475,715 | Various recoating techniques for use in SL are described including a material dispenser that allows for selective deposition from a plurality of orifices. | 5,667,820 |
| 08/479,875 | Various LOM type building techniques are described. | 5,637,169 |
| 08/486,098 Filed June 7,1995 | A description of curl distortion is provided along with various techniques for reducing this distortion. | Abandoned |
| 08/475,730 | A description of a 3D data slicing technique for obtaining cross-sectional data is described which utilizes boolean layer comparisons to define down-facing, up-facing and continuing regions. Techniques for performing cure-width compensation and for producing various object configurations relative to an initial CAD design are also described. | 5,854,748 |
| 08/480,670 | A description of an early SL Slicing technique is described including vector generation and cure width compensation. | 5,870,307 |
| 08/428,950 | Various building techniques for use | Abandoned |

-continued

| App No. | Topic | Status and/or Patent No. |
|---|---|---|
| Filed April 25, 1995 | in SL are described including various build styles involving alternate sequencing, vector interfacing and vector offsetting for forming semi-solid and solid objects. | |
| 08/428,951 Filed April 25, 1995 | Simultaneously Multiple Layer Curing techniques for SL are taught including techniques for performing vertical comparisons, correcting errors due to over curing in the z-direction, techniques for performing horizontal comparisons, and horizontal erosion routines. | Pending |
| 08/405,812 | SL recoating techniques using vibrational energy are described. | 5,688,464 |
| 08/402,553 | SL recoating techniques using a doctor blade and liquid level control techniques are described. | 5,651,934 |
| 08/382,268 Filed February 1, 1995 | Several SL recoating techniques are described including techniques involving the use of ink jets to selectively dispense material for forming a next layer of unsolidified material. | Abandoned |
| 08/148,544 | Fundamental elements of thermal stereolithography are described. | 5,501,824 |
| 07/182,801 | Support structures for SL are described. | 4,999,143 |
| 07/183,015 | Placement of holes in objects for reducing stress are described. | 5,015,424 |
| 07/365,444 | Integrated SL building, cleaning and post curing techniques are described. | 5,143,663 |
| 07/824,819 | Various aspects of a large SL apparatus are described. | 5,182,715 |
| 07/605,979 | Techniques for enhancing surface finish of SL objects are described including the use of thin fill layers in combination with thicker structural layers and meniscus smoothing. | 5,209,878 |
| 07/929,463 | Powder coating techniques are described for enhancing surface finish. | 5,234,636 |
| 07/939,549 | Building techniques for reducing curl distortion in SL (by balancing regions of stress and shrinkage) are described. | 5,238,639 |

SUMMARY OF THE DISCLOSURE

Preferred embodiments of the instant invention are directed to improved methods and apparatus for building three-dimensional objects using Rapid Prototyping & Manufacturing techniques; such as, for example, building three-dimensional objects for producing a mold or cast of these objects. Some preferred embodiments comprise the step of building interior portions of an object to form a discontinuous internal support structure on each layer which includes building with intermediate patterns on some layers that provide more than endpoint contact between structures formed on previous and subsequent layers (i.e., bridging patterns). Other preferred embodiments comprise the step of selectively determining the number of layers of skin, or the thickness of skin, to associate with each portion of an outer surface.

The step of building internal portions may further include the steps of building a hatch structure by exposing a plurality of levels with a plurality of hatch patterns, wherein at least one level is exposed with a hatch pattern composed of at least a portion of a hatch pattern from an adjacent level, and wherein the levels are each formed in association with one or more layers of the object. In some preferred embodiments, a plan view of these levels reveals a formation of the particular hatch structure being built. In one preferred embodiment, the steps of building a hatch structure further includes a spiraling or snaking technique, wherein a plurality of patterns formed by contiguous and partially overlapping portions of the hatch structure are exposed on a plurality of levels.

In some preferred embodiments, the step of selectively determining the number of layers of skin, or the thickness of skin, to associate with each portion of an outer surface comprises the step of determining whether down-facing or up-facing regions are less than a certain length, "N", in width. The determination of width may be based upon a critical circle determination of the skin area for the layer and may be implemented by way of erosion routines described in the above referenced applications and patents. If the down-facing and/or up-facing skin regions are greater than N in length, the region is further exposed such that a thicker skin is created or skin is associated with this region on one or more previous layers (if the surface is up-facing) or on one or more subsequent layers (if the surface is down-facing). In some preferred embodiments, the step of selectively determining the number of layers of skin associated with each outer surface further comprises the step of eliminating any duplicate skins for a given layer and region that may have resulted from the above association process. Further, an area that already includes a skin, may not be further exposed even with, for example, a hatch pattern or boundary pattern.

An object of some preferred embodiments of this invention is to provide more stable, yet collapsible, internal hatch patterns.

Another object of some preferred embodiments is to increase the percentage of liquid material drainable from the object.

Still another object of some preferred embodiments is to increase the success of manufacturing casts or molds.

Still another object of some preferred embodiments is to achieve reliable outward facing surfaces while simultaneously minimizing the chances of trapping building material within object boundaries or forming solid object regions of excess thickness.

Another object of some preferred embodiments is to achieve a combination of the previous objectives.

Other aspects of the invention, together with objects and attendant advantages of the various embodiments, will be understood by one of skill in the art in view of the teachings herein.

BRIEF DESCRIPTION OF THE DRAWINGS

The detailed description of the embodiments of the invention will be made with reference to the accompanying drawings, wherein like numerals designate corresponding parts in several figures.

FIG. 1g is a top view of the hexagonal hatch structure.

FIGS. 2a–2i depict another preferred embodiment of building internal portions in an object to form a rectangular hatch structure, including bridging structures.

FIGS. 3a–3g depict a preferred embodiment of building internal portions in an object to form a triangular hatch structure, including bridging structures.

FIGS. 4a–4l depict another preferred embodiment of building internal portions in an object to form a hexagonal hatch structure, including various alternative bridging structures, wherein the bridging structures only partially overlay the patterns on the previous and subsequent levels.

FIGS. 5a–5f depict another preferred bridging pattern embodiment utilizing a hexagonal snaking technique.

FIGS. 6a–6f depict an alternative preferred bridging pattern embodiment utilizing a hexagonal snaking technique.

DETAILED DESCRIPTION OF PREFERRED EMBODIMENTS

Figure 1A:
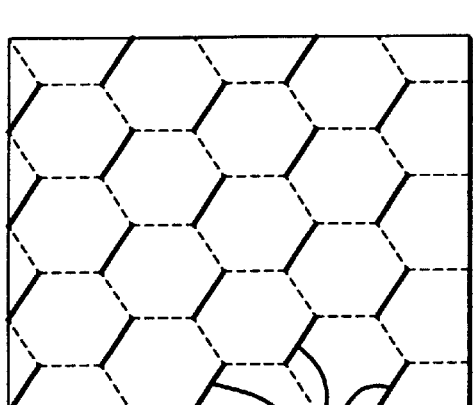
FIGS. 1a–1f depict a preferred embodiment of building internal portions in an object to form a hexagonal hatch structure, including bridging structures.

FIGS. 1a–1f depict the building of a discontinuous hatch structure 10 (shown in FIG. 1g) including a plurality of separate elements or segments, according to a preferred embodiment of the invention. The building of the hatch structure 10 comprises the steps of forming a first level 12 with a first pattern 14; forming a second level 16 with a second pattern 18, wherein the second pattern 18 includes at least a portion of the first pattern 14 at least and a portion of a third pattern 22; forming a third level 20 with the third pattern 22; forming a fourth level 24 with a fourth pattern 26, wherein the fourth pattern 26 includes at least a portion of the third pattern 22 at least and a portion of a fifth pattern 30; forming a fifth level 28 with the fifth pattern 30; and forming a sixth level 32 with a sixth pattern 34, wherein the sixth pattern 34 includes at least fifth the pattern 30 and at least the first pattern 16. FIG. 1g depicts a top view of the hatch structure 10 formed by the six patterns formed on the six levels.

Figure 1B:
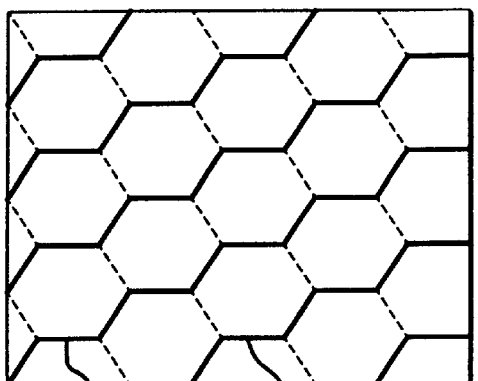
Figure 1C:
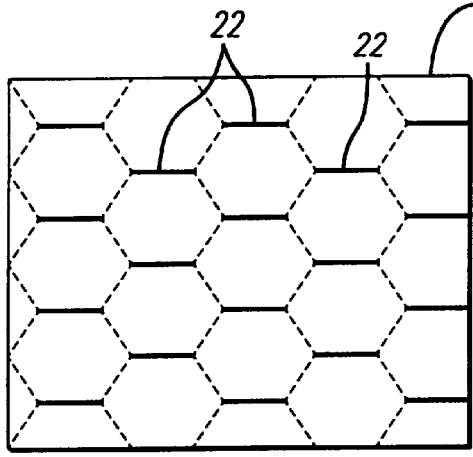
Figure 1D:
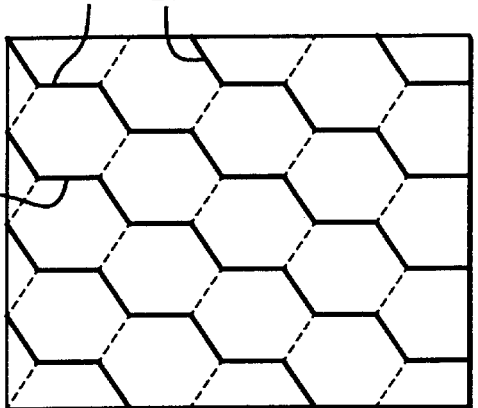
Figure 1E:
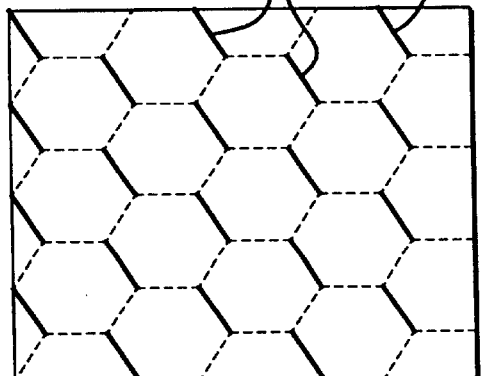
Figure 1F:
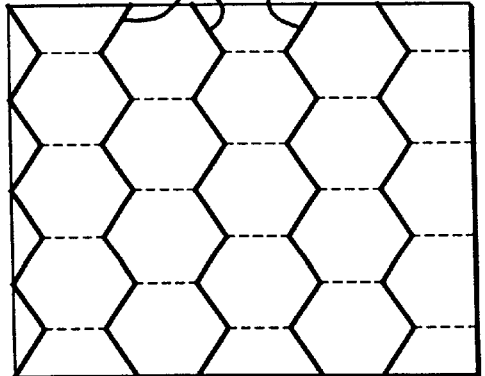

The second pattern 18, fourth pattern 26 and sixth pattern 34 are intermediate or bridging patterns, wherein intermediate or bridging patterns are patterns composed of at least a portion of the patterns on the previous and the subsequent levels. Alternatively, the first pattern 14, third pattern 22 and fifth pattern 30 may be considered the bridging levels for the second pattern 18, fourth pattern 26 and sixth pattern 34. For example, as shown in FIG. 1b, the second pattern 18 is composed from the first pattern 14 and the third pattern 22, wherein the first pattern 14 is formed on the first level 12, i.e., the level depicted in FIG. 1a, and the third pattern 22 is formed on the third level 20, i.e., the level depicted in FIG. 1c. Thus, the bridging level is located on the layer(s) intermediate to the immediately previous and immediately subsequent levels.

Figure 2E:
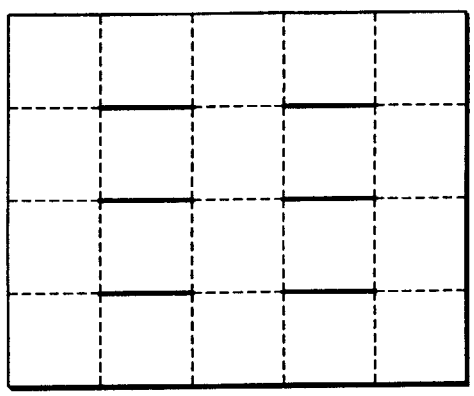
Figure 2F:
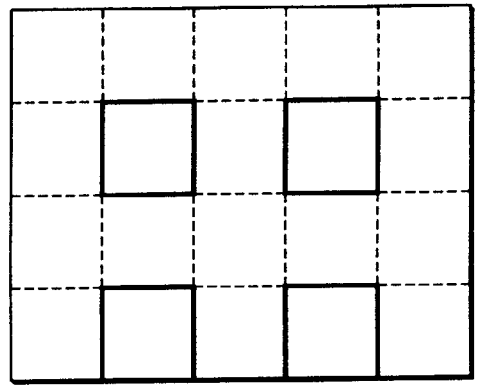
Figure 2G:
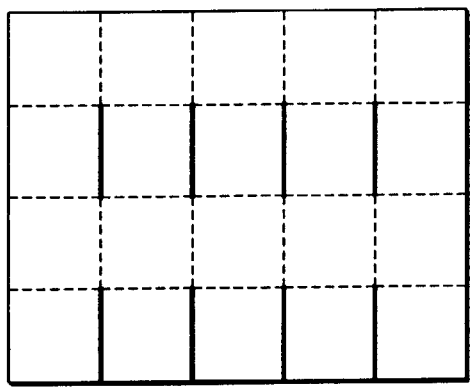
Figure 2H:
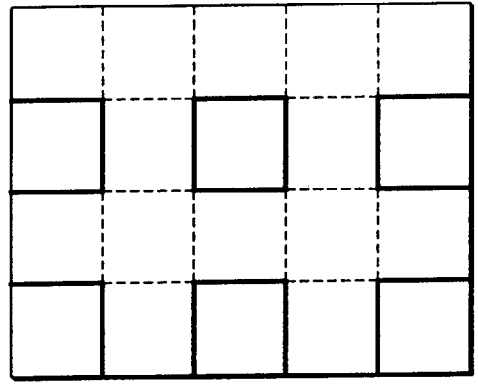
Figure 2I:
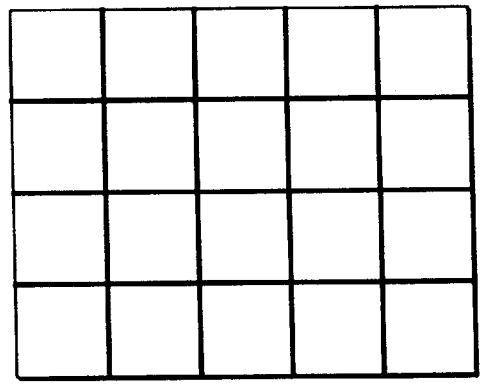

FIGS. 2a–2i depict other preferred embodiments wherein a rectangular hatch pattern is utilized. FIGS. 2a, 2c, 2e and 2g depict portions of the basic hatch structure. FIGS. 2b, 2d, 2f and 2h depict bridging patterns associated with the basic hatch structures of FIGS. 2a, 2c, 2e and 2g. FIG. 2i depicts the top view of the hatch pattern formed according to the patterns depicted in FIGS. 2a–2h.

Figure 3A:
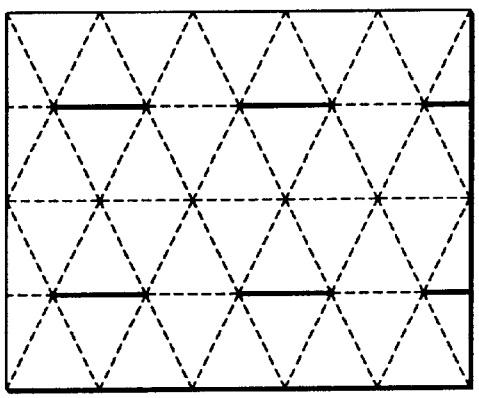
Figure 3B:
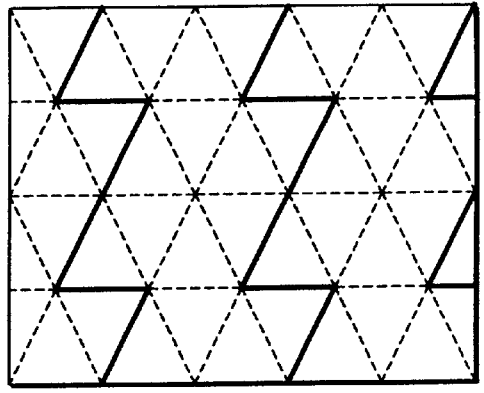
Figure 3C:
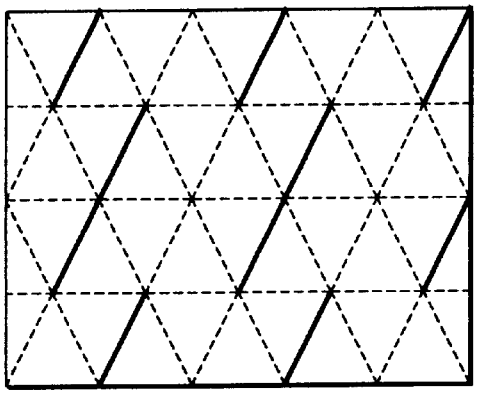
Figure 3D:
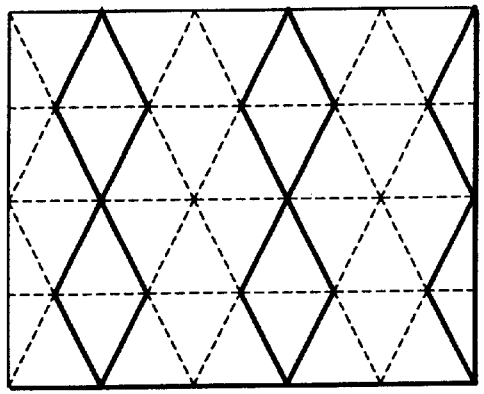
Figure 3E:
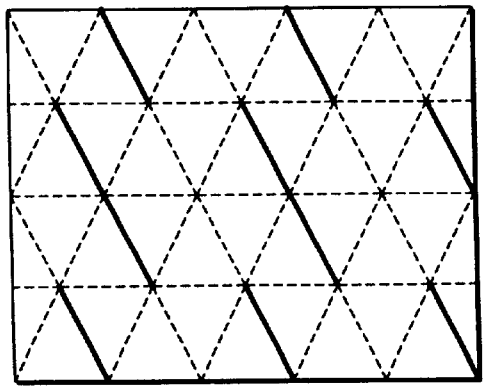
Figure 3F:
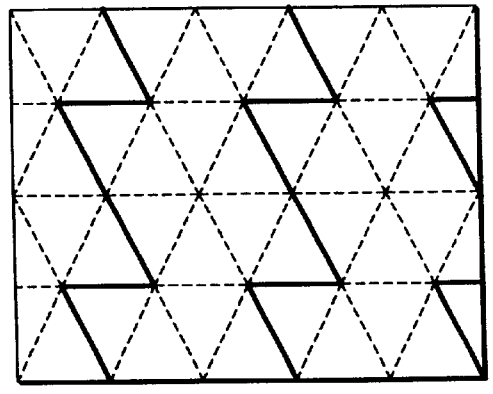

FIGS. 3a–3g depict other preferred embodiments wherein a triangular hatch pattern is utilized. FIGS. 3a, 3c and 3e depict portions of the basic hatch structure. FIGS. 3b, 3d and 3f depict bridging patterns associated with the basic hatch structures of FIGS. 3a, 3c and 3e. FIG. 3g depicts the top view of the hatch pattern formed according to the patterns depicted in FIGS. 3a–3f.

The selected hatch patterns and bridging patterns depicted in FIGS. 1a–1f, 2a–2h and 3a–3f are not limited to the order of formation illustrated. They are not further limited to the patterns illustrated, but rather, may include, for example, (1) portions of patterns formed from two or more adjacent or nonadjacent pattern segments; (2) different numbers of pattern portions; (3) pattern portions may be repeated prior to forming each portion of the pattern; and (4) combinations of the patterns illustrated or combinations with patterns discussed in the previously referenced applications and patents.

Figure 4E:
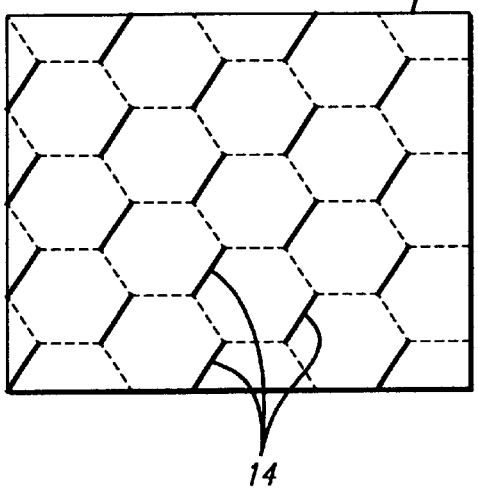
Figure 4F:
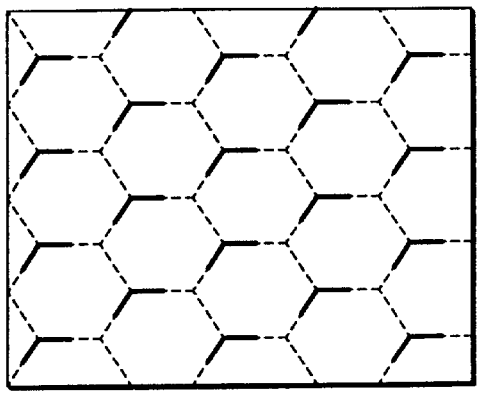
Figure 4G:
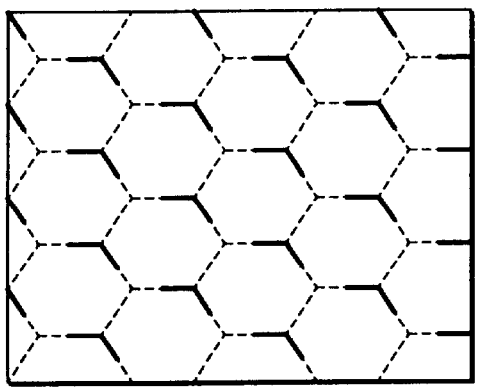
Figure 4H:
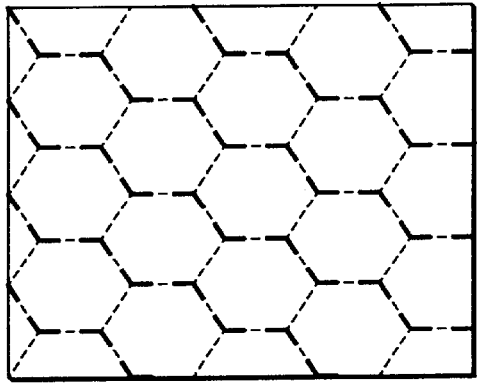
Figure 4I:
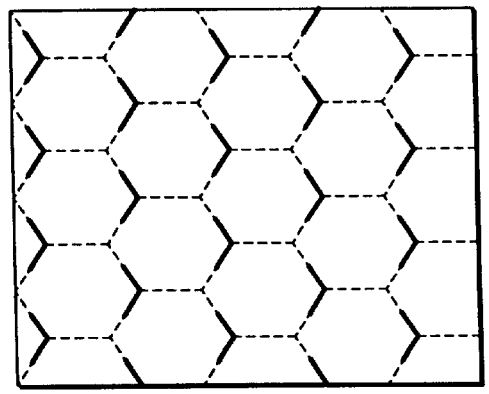
Figure 4J:
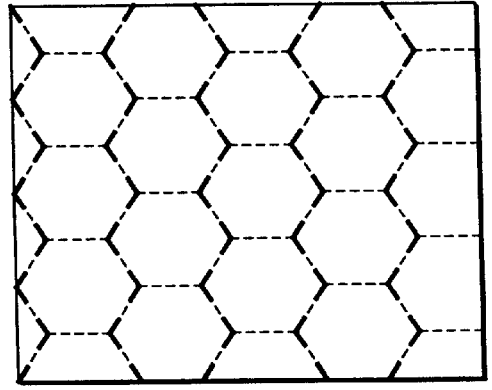
Figure 4K:
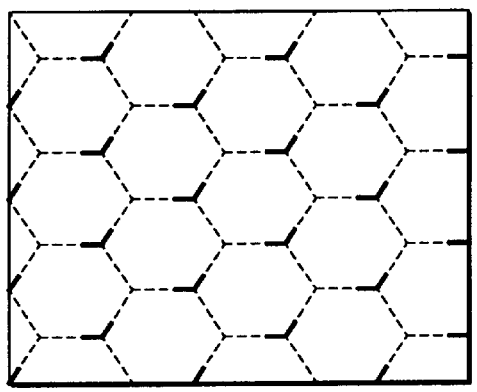
Figure 4L:
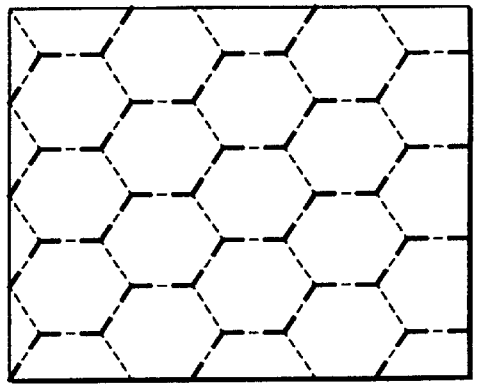
Figure 5A:
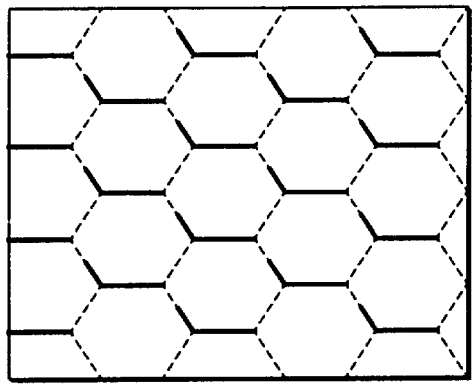
Figure 5B:
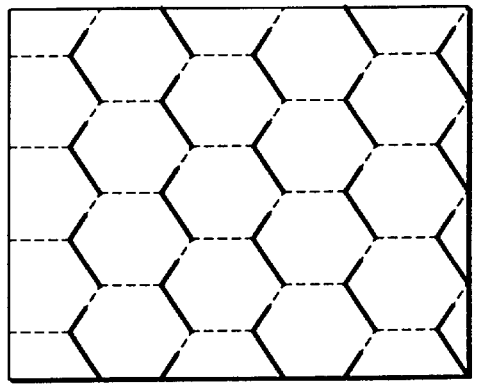
Figure 5C:
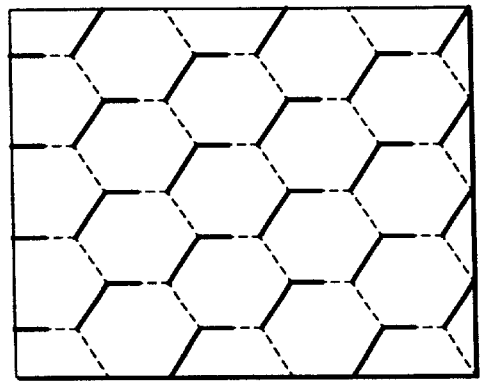
Figure 5D:
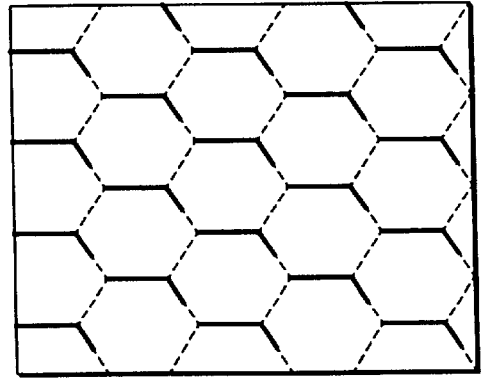
Figure 6E:
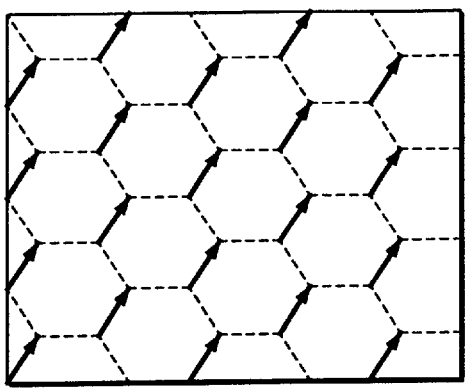
Figure 6F:
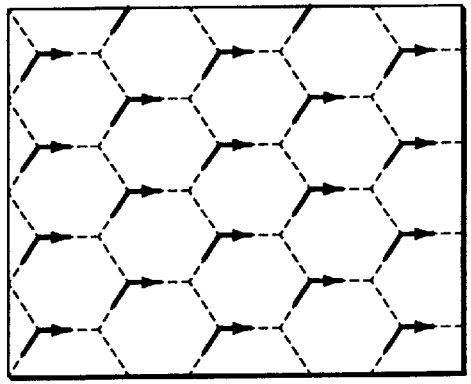

In other preferred embodiments, such as that shown in FIGS. 4a–4l, the bridging pattern is composed from only a portion of the patterns on the previous and subsequent levels. As shown in FIG. 4f, for example, the bridging pattern includes a portion of the first pattern 14 and a portion of the third pattern 22. An alternative set of bridging patterns are depicted in FIGS. 4g, 4i and 4k, respectively for levels 20, 28 and 12 depicted in FIGS. 4a, 4c and 4e. In these embodiments, only one end of each element on the subsequent level is supported by the bridging elements. FIGS. 4h, 4j and 4l depict another set of alternative bridging patterns corresponding to the transitions from FIGS. 4a to 4c, 4c to 4e and 4e to 4a. In this alternative, the end portion of each element on the subsequent level is supported by the bridging elements.

The discontinuous nature of the internal structure 10 not only allows for ease of liquid drainage from the object, but allows for ease of collapse of the internal portion of the object such that in, for example, an investment casting process the mold will not crack during burn out of the pattern. Although the patterns comprising the internal structure 10 are generally formed by straight lines, as shown in FIGS. 1–4, to increase collapsibility of the internal portion of the object, the patterns can be formed using lines with bends between intersection points of the individual elements, e.g., segments, forming the pattern.

In addition to being dependent, in part, on a discontinuous hatch structure, the ease of drainage of the liquid from the object is dependent, in part, on the hatch spacing. Indeed, if the hatch spacing is too close, small channels may form that tend to trap or inhibit the flow of liquid. Thus, there must be sufficient distance between the hatch lines to avoid the formation of small channels and allow drainage of the liquid from the object. In one preferred embodiment, the hatch spacing is 150 mils.

The levels forming the internal portions of the object are each formed in association with one or more layers of the object. Each particular level is composed of a specified number of object layers, wherein each of the layers is formed with a particular pattern portion such that the pattern is built in conjunction with the formation of the object layers. In such a case, as the object layers increase in height, the pattern increases in height. In some preferred embodiments, the formation of pattern portions is repeated periodically. In other preferred embodiments, the pattern may be repeated aperiodically, different patterns may be mixed, patterns may be based upon fixed position and spacing increments, or may be based on variable position and spacing increments and may even be based on geometry dependent position and spacing increments. In further alternative embodiments, the pattern size or spacing may vary between portions of the same layer. In still further embodiments, other polygonal patterns or nonpolygonal patterns may be utilized as opposed to those specifically illustrated herein.

Generally, the levels that include the bridging patterns are not formed with the same number of object layers as the levels containing the non-bridging patterns. The levels that include the bridging patterns, or Z-bond layers, provide support for the levels containing the non-bridging patterns. Indeed, the overlap of the pattern in the Z-bond layers with the patterns of the previous and subsequent levels provides support because more than one point of contact exists between the adjacent levels. In one preferred embodiment of FIGS. 1a–1g, the first and second levels form a combined height of 50–150 mils, preferably, 80–100 mils, wherein the second level comprises 10–30 mils, preferably 15–25 mils. In terms of object layers, of four mil height each, the number of layers for the combined levels is 12–36 layers, including 2–5 layers forming the second level. The third and fourth levels, and the fifth and sixth levels, have similar heights and relationships as discussed above for the first and second level.

FIGS. 5a–5f depict another preferred embodiment for building an internal structure further comprising a spiraling or snaking technique, wherein a plurality of patterns, each pattern being a contiguous and partially overlapping portion of the hatch structure 10, are formed on a plurality of levels. A plan view of the hatch structure of this example is shown in FIG. 1g.

FIGS. 6a–6f depict an alternative snaking technique, wherein the formed length on each level is different from that depicted in FIGS. 5a–5f and wherein the overlap portion is different between the embodiments. FIGS. 6a–6f also depict the direction of rotation as individual portions of the hexagons are formed.

These snaking patterns as illustrated in FIGS. 5 and 6 may be utilized with other internal structure patterns, including, but not limited to, for example, rectangular and triangular patterns. The amount of snaking or extension between levels may be varied to produce pattern formation in very few levels or alternatively to produce pattern formation only after a large number of layers. The amount of snaking may vary from level to level. Additional scanning patterns may be used periodically so as to ensure adequate structural strength by providing additional links between individual patterns. This may be of increasing importance as the number of levels is increased prior to completion of pattern formation.

Figure 7A:
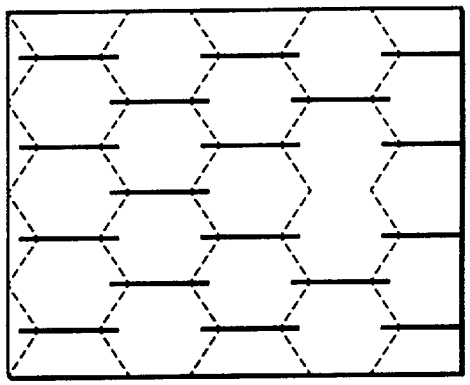
FIGS. 7a–7d depict a preferred embodiment for building internal portions in an object to form a hatch structure, wherein the levels are exposed by overdrawn patterns.
Figure 7B:
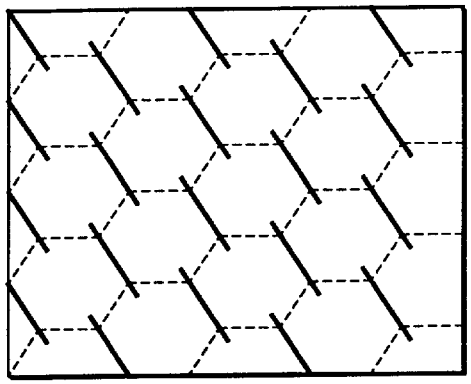
Figure 7C:
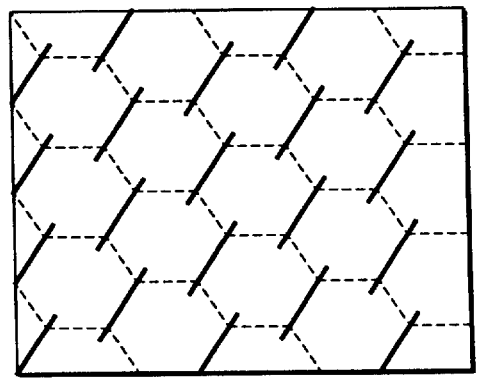
Figure 7D:
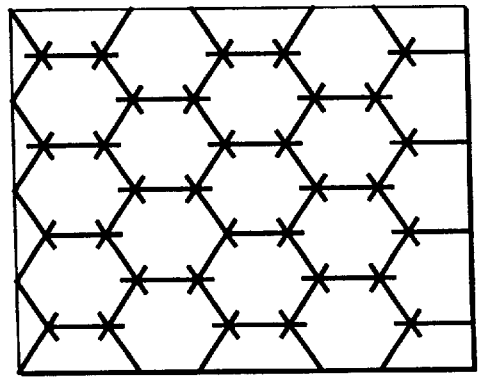

FIGS. 7a–7d depict another preferred embodiment of building an internal hatch structure. As shown in FIGS. 7a–7c, the pattern exposed on a given level is overdrawn such that adjacent levels are connected and supported by the overdrawn intersection of the patterns on the adjacent levels. In some preferred embodiments, the extension of the lines beyond the intersection point may be as much as 50 mils. In other embodiments, the extension may be as little as a few mils, e.g., 5–10 mils or 1 beam radius.

In addition to building discontinuous hatch structures with bridging patterns, other steps may be performed that provide for an improved build style and increase the drainage of liquid from the object. For instance, some preferred embodiments of the instant invention comprise the step of selectively determining the number of layers of skin, or the thickness of skin, to associate with each portion of an outer surface. It has been found unnecessary to use thickened or multiple layers of skin on all portions of the object's outer surface. One advantage to limiting the amount of thickened skin is to minimize the amount of blockage in small vertical regions of the object. If the height of an object is relatively short, then use of multiple down-facing skin layers and multiple up-facing skin layers can result in formation of solid regions that are separated by only a small vertical gap. This gap may tend to trap or reduce the ability of the liquid to flow out of the region. This in turn can result in trapped liquid which may become solidified resulting in a relatively thick solid structure that can lead to mold cracking if the object is used as an investment casting pattern.

The step of selectively determining the number of layers of skin, or the thickness of skin, to associate with each portion of an outer surface may further comprise the step of determining whether a down-facing and/or up-facing surface region on a given layer are less than a certain amount, "N", in width. It has been found that if the width of the surface region is small, the use of multiple skin layers or extra thick skin is unnecessary. In particular, in one preferred embodiment, if the skin region has a width in any dimension less than 20–60 mils, use of multiple layers of skin is unnecessary and desirably avoided. If a down-facing or up-facing skin region has a width greater than N, that region is formed using multiple layers of skin. If the width is greater than "N", a total of two or more layers of skin are used in forming the up-facing and/or down-facing surfaces of the object (e.g. in one preferred embodiment three layers of skin are used). In some preferred embodiments, the width N is determined by a critical circle determination as described in some of the previously incorporated patents and applications.

In some preferred embodiments, the step of selectively determining the number of layers of skin to associate with each portion of an outer surface further comprises the step of eliminating a duplicate skin, i.e. one skin is kept, which may be placed below up-facing surface layers and above down-facing surface layers. The elimination of duplicate skin includes the determination of whether a particular portion, or area, of an object already includes a skin. Further preferred embodiments include the elimination of hatch or other internal structure in regions which are to be formed by skin.

Although the foregoing describes the invention with preferred embodiments, this is not intended to limit the invention. Rather, the foregoing is intended to cover all modifications and alternative constructions falling within the spirit and scope of the invention as expressed in the appended claims.

What is claimed is:

1. A method of forming a three-dimensional object on a layer-by-layer basis from a solidifiable medium, the object having an upward facing skin surface defined by at least one skin layer, a downward facing skin surface defined by at least one further skin layer and at least one intermediate layer between said upward and downward facing skin surface layers, the method comprising:

defining a width dimension N;

determining whether at least one of a downward-facing skin surface and an upward-facing skin surface of the object has a width less than N;

determining the number of layers for at least one of said upward facing skin surface and said downward facing skin surface, dependent on the determination of whether the surface has a width less than N, wherein the number of layers for surface having a width greater than N is greater than the number of layers for a surface having a width less than N;

forming said upward and downward facing skin surfaces with the number of layers determined in said layer number determining step; and forming at least one intermediate layer between the upward and downward facing skin surfaces while forming the three-dimensional object.

2. A method as recited in claim 1, wherein N is a value between about 20–60 mils.

3. A method of forming a three-dimensional object on a layer-by-layer basis from a solidifiable medium, the object having an upward facing skin surface defined by at least one skin layer, a downward facing skin surface defined by at least one further skin layer and at least one intermediate layer between said upward and downward facing skin surface layers, the method comprising:

determining whether at least one of a down-facing skin surface and an up-facing skin surface of the object has a width less than N;

determining the number of layers for at least one of said upward facing surface and said downward facing surface, dependent on the determination of whether the surface has a width less than N, wherein the number of layers for surface having a width greater than N is greater than the number of layers for a surface having a width less than N;

forming said upward and downward facing skin surfaces with the number of layers determined in said layer number determining step; and forming at least one intermediate layer between the upward and downward facing skin while forming the three-dimensional object.

4. A method as recited in claim 3, wherein N is a value between about 20–60 mils.

5. A method of forming a three-dimensional object from a solidifiable liquid medium with improved build style and improved drainage having plural object regions, forming the object on a layer-by-layer basis from a liquid solidifiable medium, each given object region defining a height dimension, each object region having an upward facing skin surface defined by at least one skin layer, and a downward facing skin surface defined by at least one further skin layer, the method comprising:

identifying a desired height;

determining whether the height of a given region is less than the desired height;

determining the number of layers for forming at least one of said upward facing skin surface and said downward facing skin surface of said given region dependent on the determination of whether the height for the given region is less than the desired height, wherein the number of layers for forming a skin surface of a region having a height less than the desired height is less than the number of layers for forming a skin surface of a region having a height dimension greater than the desired height; and forming said upward and downward facing skin surfaces with the number of layers determined in said layer number determining step while forming the three-dimensional object to improve the drainage of solidifiable liquid from the object.

6. A method of forming a three-dimensional object from a solidifiable liquid medium with improved build style having plural object regions, on a layer-by-layer basis from a solidifiable liquid medium, each given object region having a width N, each object region having an upward facing skin surface defined by at least one skin layer and a downward facing skin surface defined by at least one further skin layer, each skin layer having a thickness, the method comprising:

selecting a first number of layers for forming the downward facing skin surface and a second number of layers for forming the upward facing skin surface of each object region, wherein the first number of layers and the second number of layers are selected based on determining whether the downward facing surface and/or the upward facing surface on a given object region are less than N; and forming said upward and downward facing skin surfaces with the number of layers determined in said layer number selecting step while forming the three-dimensional object.

7. The method according to claim 6, wherein N has a value between about 20 to about 60 mils.

* * * * *